United States Patent
Kreschel

(10) Patent No.: US 11,654,497 B2
(45) Date of Patent: May 23, 2023

(54) METHOD FOR CUTTING A GEAR AND GEAR-CUTTING MACHINE

(71) Applicant: GLEASON-PFAUTER MASCHINENFABRIK GMBH, Ludwigsburg (DE)

(72) Inventor: Jürgen Kreschel, Hemmingen (DE)

(73) Assignee: GLEASON-PFAUTER MASCHINENFABRIK GMBH, Ludwigsburg (DE)

( * ) Notice: Subject to any disclaimer, the term of this patent is extended or adjusted under 35 U.S.C. 154(b) by 426 days.

(21) Appl. No.: 16/763,940

(22) PCT Filed: Oct. 19, 2018

(86) PCT No.: PCT/EP2018/078793
§ 371 (c)(1),
(2) Date: May 13, 2020

(87) PCT Pub. No.: WO2019/096542
PCT Pub. Date: May 23, 2019

(65) Prior Publication Data
US 2020/0361012 A1    Nov. 19, 2020

(30) Foreign Application Priority Data

Nov. 15, 2017   (DE) .......................... 102017010598.7

(51) Int. Cl.
*G05B 19/18*   (2006.01)
*B23F 5/16*   (2006.01)
(Continued)

(52) U.S. Cl.
CPC .......... *B23F 5/163* (2013.01); *B23F 23/1218* (2013.01); *G05B 19/186* (2013.01);
(Continued)

(58) Field of Classification Search
CPC ................ G05B 19/186; G05B 19/401; G05B 2219/36198; G05B 2219/50063
(Continued)

(56) References Cited

U.S. PATENT DOCUMENTS 5,239,782 A    8/1993  Lorenz et al.
5,899,645 A  *  5/1999  Garschagen .......... B23F 19/105
                                                                  409/9
(Continued)

FOREIGN PATENT DOCUMENTS

DE            153196 A1  * 12/1981
DE          3930321 C1  *  5/1990
(Continued)

OTHER PUBLICATIONS

International Search Report and Written Opinion for PCT/EP2018/078793, ISA/EPO, dated Feb. 20, 2019, 13 pgs.
(Continued)

*Primary Examiner* — Hien D Khuu
(74) *Attorney, Agent, or Firm* — Robert L. McDowell

(57) ABSTRACT

A method for machining a toothing of a workpiece held in a clamping, in which a toothing tool that rotates about its rotational axis and comprises cutting edges is brought into rolling chip-removing machining engagement with the toothing that rotates about its rotational axis, in order to produce a predetermined tooth flank end geometry in one or more machining passes, wherein during the machining pass which produces the tooth flank end geometry, monitoring responsive to the event of a removed chip being pressed into a machined tooth flank of the toothing by means of the rolling machining process is carried out and, if the monitoring responds, an additional toothing machining process that removes the material protrusion on top of the tooth flank end geometry formed by the chip that was pressed in is
(Continued)

Figure 1:
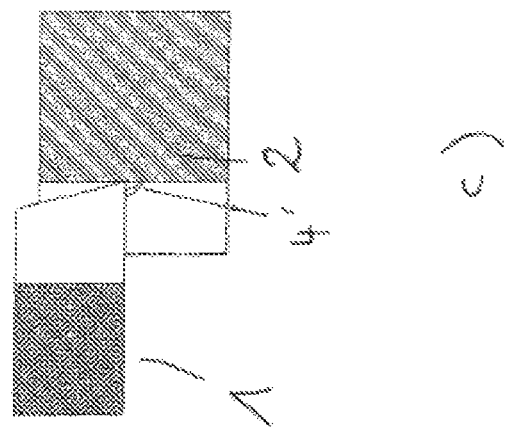
Figure 1:
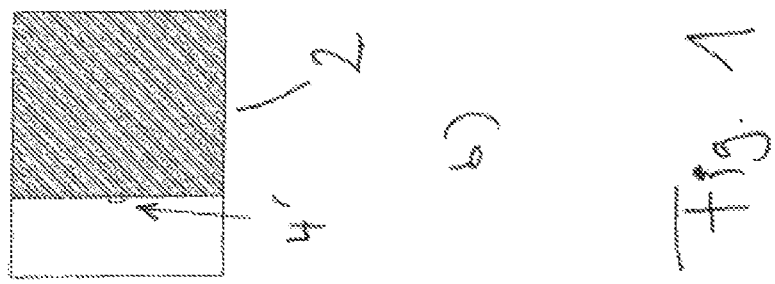
Figure 1:
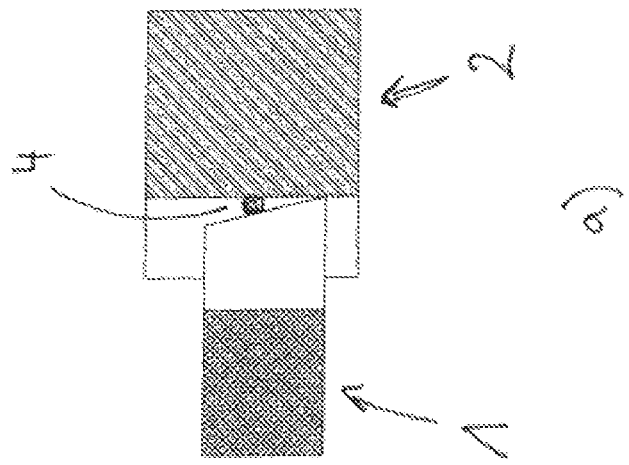

implemented automatically, which process is carried out in the same clamping of the workpiece and by means of the toothing tool.

12 Claims, 4 Drawing Sheets

(51) Int. Cl.
*B23F 23/12* (2006.01)
*G05B 19/401* (2006.01)

(52) U.S. Cl.
CPC .. *G05B 19/401* (2013.01); *G05B 2219/36198* (2013.01); *G05B 2219/50063* (2013.01)

(58) Field of Classification Search
USPC .......................................................... 409/12
See application file for complete search history.

(56) References Cited

U.S. PATENT DOCUMENTS

| | | | | |
|---|---|---|---|---|
| 11,110,529 | B2 * | 9/2021 | Hipke | ................... B23F 17/006 |
| 2005/0272350 | A1 * | 12/2005 | Harwath-Seyfried | .... B23C 5/08 |
| | | | | 407/53 |
| 2015/0088298 | A1 | 3/2015 | Kurita et al. | |
| 2019/0076944 | A1 * | 3/2019 | Würfel | ................ G05B 19/186 |

FOREIGN PATENT DOCUMENTS

| | | | | |
|---|---|---|---|---|
| DE | 10012158 | A1 | 9/2001 | |
| DE | 19933137 | B4 * | 8/2014 | ............. B23F 19/00 |
| DE | 102015202760 | A1 | 8/2016 | |
| DE | 102015009154 | A1 * | 1/2017 | ........... B23F 19/005 |
| EP | 0496004 | A1 | 7/1992 | |
| EP | 2283958 | A1 | 2/2011 | |
| FR | 2695723 | A1 | 3/1994 | |
| JP | 2001-347423 | A | 12/2001 | |
| WO | 97/49523 | A1 | 12/1997 | |
| WO | WO-2003074220 | A1 * | 9/2003 | ............. B23F 19/10 |
| WO | WO-2016131560 | A1 * | 8/2016 | |

OTHER PUBLICATIONS

Search Report from the German Patent Office for DE 102017010598. 7, GPTO, dated Jul. 6, 2018, 7 pgs.

* cited by examiner

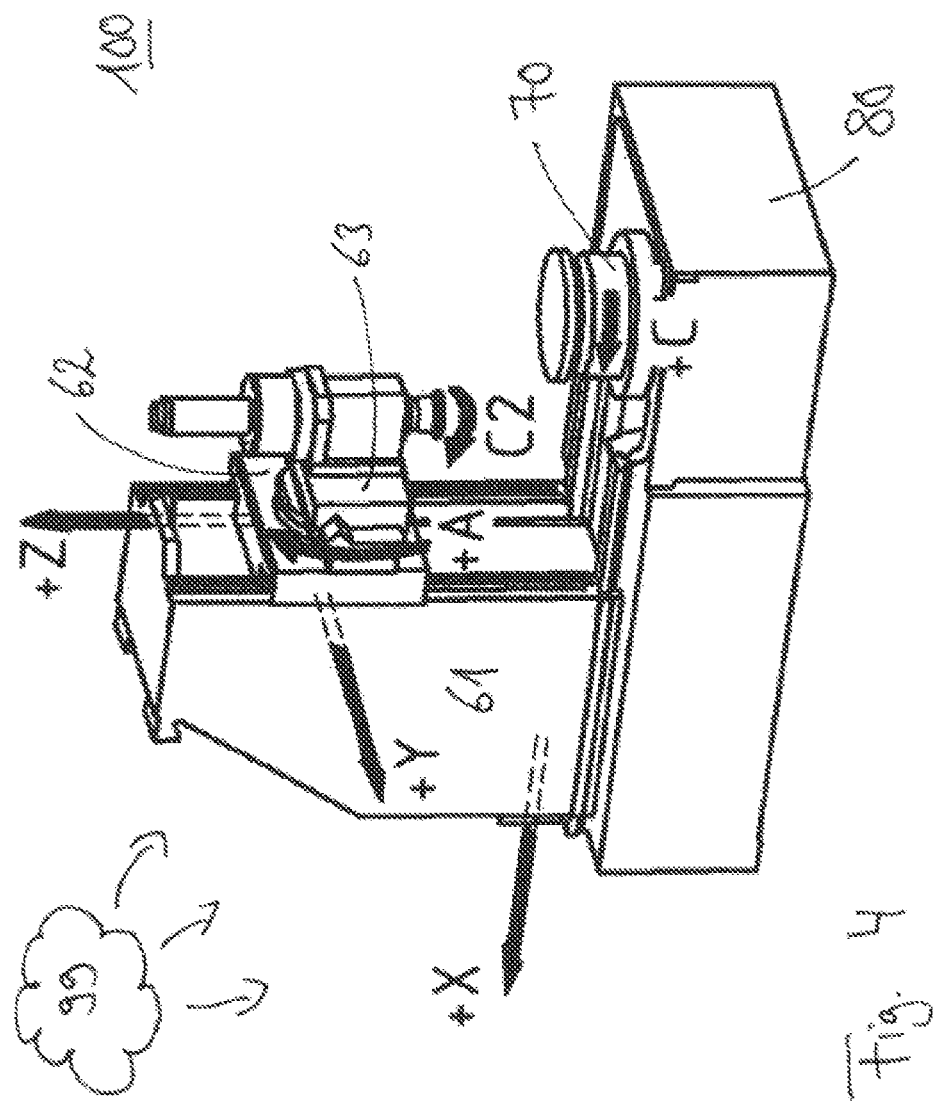

METHOD FOR CUTTING A GEAR AND GEAR-CUTTING MACHINE

The invention relates to a method for machining a toothing of a workpiece held in a clamping, in which method a toothing tool that rotates about its rotational axis and comprises cutting edges is brought into in particular rolling chip-removing machining engagement with the toothing that in particular rotates about its rotational axis, in order to produce a predetermined tooth flank end geometry in one or more machining passes.

Methods of this kind are known, the best-known examples of which include hobbing, shaping and power skiving.

The toothings produced are often used in gear systems, and for the purpose of said use in the gear systems are checked beforehand using measurement processes, for example for toothing defects that could later result in unwanted noises or other failures in the gear system. If, for example, a toothing flank modification provided for the intended load-bearing capacity of the tooth flanks, e.g. in the form of a desired crown, is not achieved, readjustments can be made to the manufacturing process on the basis of the results of the measurement processes, or, if necessary, individual workpieces can be discarded. Nevertheless, toothings produced often do not display the desired properties when later used in the gear system.

The problem addressed by the present invention is therefore that of improving a method of the kind mentioned at the outset in particular in terms of more reliable later use of the toothings.

This problem is solved in terms of the method by a development of the method of the type mentioned at the outset, which is essentially characterized in that during the machining pass which produces the tooth flank end geometry, monitoring responsive to the event of an already removed chip being pressed into a machined tooth flank of the toothing by means of the in particular rolling machining process is carried out and, if the monitoring responds, an additional toothing machining process that removes the material protrusion on top of the tooth flank end geometry formed by the chip that was pressed in during the event which occurred is implemented in particular automatically, which process is carried out in particular in the same clamping of the workpiece and in particular by means of the toothing tool itself.

The invention is initially based on the knowledge that the unsatisfactory properties are due to the fact that, in the final machining pass provided, a flying chip can get into a gap between a surface of the toothing tool and the toothing of the workpiece and be pressed into the already machined tooth flank of the toothing as a result of the hobbing process of the toothing tool. These pressed-in chips are not easily mechanically detachable because, due to the temperatures that usually occur during machining, there is a kind of cold welding or friction welding with the material of the workpiece.

The invention is furthermore based on the knowledge that events of this type often occur in the root region of the toothing and as isolated incidents, and therefore the monitoring and measurement processes that are usually carried out do not identify such events reliably enough to ensure a sufficiently high success rate when discarding unsuitable toothings.

Finally, the invention is based on the knowledge that it is possible to determine whether a detrimental event of this type has occurred as early as during said machining pass, and not only by means of subsequent monitoring, and also on the knowledge that even in a suspected case there can be a response directly in situ and as required without additional tools. The additional toothing machining process thus eliminates the defect caused by the pressed-in chip without modifying the tooth flank end geometry itself.

Although time is lost carrying out the additional toothing machining process, resulting in different machining times for the same workpieces in a batch such that there is inconsistency in the machining cycle, the invention is also based on the knowledge that this lost time is offset by the effect and improvement in the reliability of the workpieces achieved by the additional toothing machining process.

In an expedient embodiment of the method, the monitoring responds when the amplitude of the time curve of a parameter that is monitored by the monitoring exceeds a predetermined threshold value. The predefined threshold value is set such that a safety distance from a background noise of the time curve of the parameter is maintained in order to reduce the risk of a response despite an event not having occurred. In addition, the threshold value must not be set so high that events that do occur are no longer recorded. The amplitude in the case of an event has proven to differ from the background noise to such an extent that the threshold can be suitably determined without major difficulties by carrying out tests, for example in the region of a small multiple of the standard deviation of the background noise. It is also by all means possible to select different thresholds depending on the monitoring technology and monitoring parameters used.

In a preferred embodiment, the additional toothing machining process is a repetition, at least over a width portion of the toothing, of the machining pass that triggers the response of the monitoring. In this way, the welded-on chip can be reliably removed. It is conceivable in an unfortunate case for a chip to be pressed in again when the additional toothing machining process is carried out, but this would also be detected by the monitoring and could be remedied.

In another preferred embodiment of the method, the additional toothing machining process is carried out using a larger distance between the tool and the toothing compared with the machining pass that triggers the response of the monitoring. For example, the advancing motion is reduced by a value in the order of magnitude of the cutting edge toothing of the tool, e.g. in the range of from 5-40 µm, in particular 10-30 µm, compared with the machining pass that triggers the event. This is sufficient to catch and detach the pressed-in chip. If an impression of the previously pressed-in chip remains in the tooth flank geometry, this is significantly less detrimental for later use in the gear system than a material protrusion on top of the tooth flank formed by the previously pressed-in chip.

In another preferred embodiment, a toothing width range to which the event is to be assigned is determined from the exceedance of the threshold value, and the additional toothing machining process is carried out in particular on the basis of the determined toothing range. In particular in the case of larger toothing widths, working time for the additional toothing machining process can be cut down if machining is carried out only in the affected region or e.g. only up to the affected region or only starting from the affected region during the additional toothing machining process, depending on whether the affected region is closer to the end of the toothing at which machining begins or the end of the toothing at which machining ends.

In principle, it is not impossible for a double event to be detected in the machining pass that generates the tooth flank end geometry. In this case, in particular for the purpose of simplification, the additional toothing machining process can be allowed to run over the full width of the toothing.

In one conceivable embodiment, two parameters can also be monitored, and the monitoring responds if the amplitude of the time curves of both parameters exceeds respective predetermined threshold values at the same time. This ensures higher redundancy in the event that monitoring does not respond, or responds for a different reason.

In the majority of cases, the monitoring will respond to a one-off triggering event. However, a recurring abnormality in the monitored curve of the parameter indicates another defect that would have to be considered and eliminated separately.

As to how the monitoring is carried out, various possibilities are conceivable—external sensors, e.g. acoustic sensors, for instance. However, it is preferable for machine operating parameters to be used, e.g. directly or indirectly relating to the rotational speed of the workpiece or the torque of the workpiece rotation, or to the rotational speed of the tool or the torque of the tool rotation.

In this way, a rotational speed can be monitored directly, or control deviations in the rotational speed control or torque deviations can be used. This can also be done indirectly, for example using current measurements that are provided for control of the rotational axes. Other machine axes can also be used for this purpose.

The method is suitable for machining both external toothings and internal toothings, and proves especially effective on internal toothings in particular.

Furthermore, the method is in particular intended for hobbing and power skiving, particularly preferably for power skiving internal toothings. It can also be used when further toothings are formed within toothings, for example in the form of forming cutouts in an internal toothing, and not only when producing the internal toothing itself. Shaping and scraping are also conceivable machining method configurations. The method can also be used for producing bevel gears.

Monitoring can also be carried out during preceding roughing passes in order to e.g. record the number of detected events and, if necessary, to incorporate said number into the decision as to when the tool is to be resharpened or replaced.

The method is also protected by control technology in the form of a computer program product that can be used to control a toothing machine, as well as in the form of a toothing machine that can be controlled so as to carry out this method.

Figure 2:
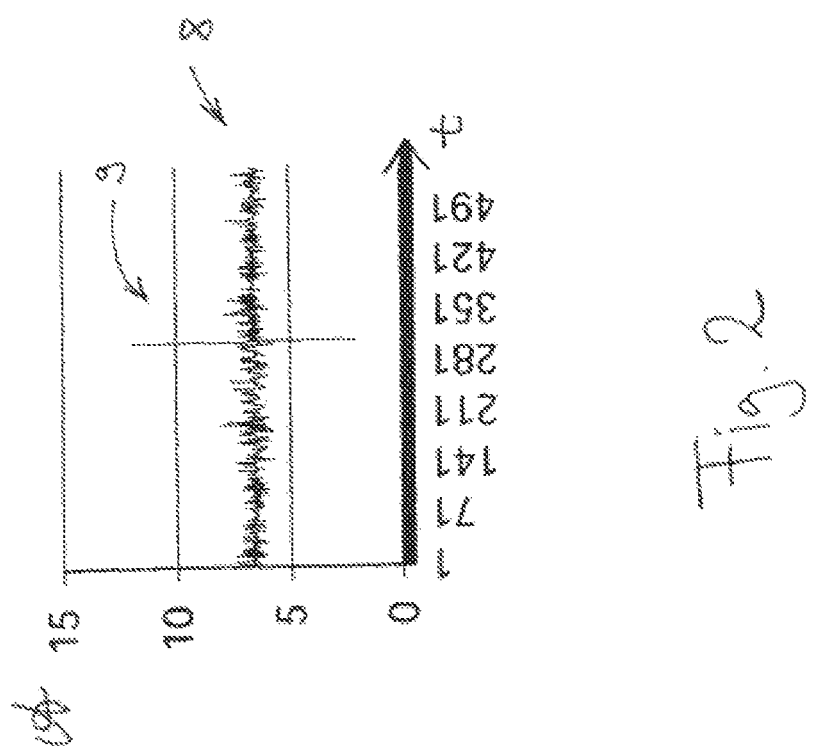
Figure 3:
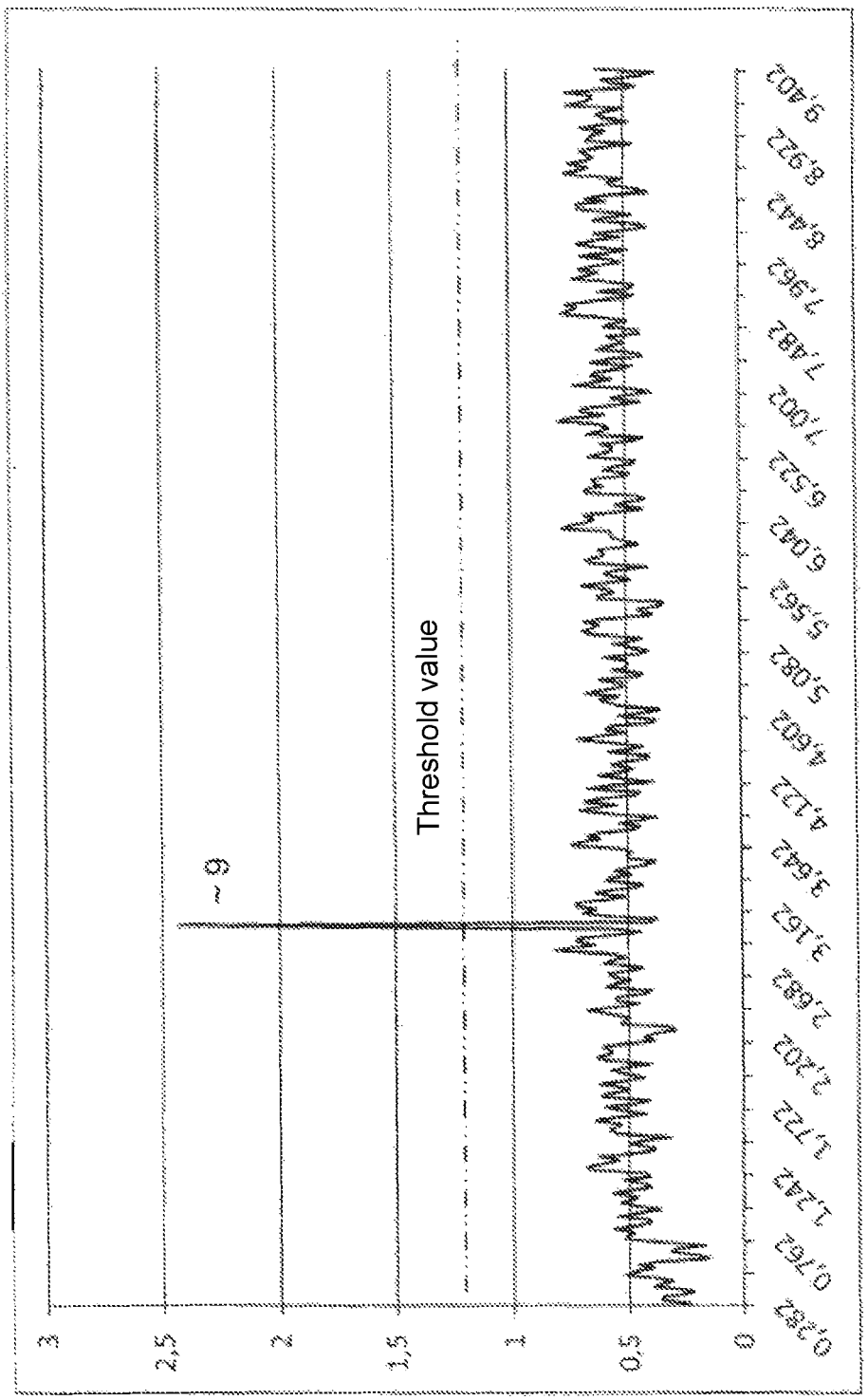

Further features, details and advantages of the invention can be found in the following description with reference to the accompanying drawings, in which FIG. 1 is schematic diagrams of a toothing in partial engagement with a tool that illustrate the invention, FIG. 2 is a schematic illustration of monitoring, FIG. 3 shows a real measurement corresponding to FIG. 2, and FIG. 4 is a toothing machine designed as a power skiving machine.

FIG. 1 briefly illustrates again the events occurring on the machined toothing in the context of the invention. As such, FIG. 1a shows how, when a toothing 2 is machined in a final finishing pass by a toothing tool 1, in the case shown here a power skiving wheel, a chip 4 (shown rolled up in FIG. 1a) gets into a gap between the power skiving wheel 1 and the toothing 2 and is rollingly pressed into the toothing 2 during machining. This state is shown in FIG. 1b, in which the pressed-in chip is denoted by 4'. FIG. 1c schematically shows the situation in which the pressed-in chip 4' is removed in an additional toothing machining process. It can be seen from FIG. 1c that the pressed-in chip 4' is removed by the same power skiving wheel 1 that previously pressed the chip 4 into the toothing 2.

Furthermore, in this embodiment there is no change in the workpiece clamping in the situation shown between FIGS. 1a, b and 1c. Rather, the workpiece having the toothing 2 is held in the same clamping. The presence of the pressed-in chip 4' is detected by monitoring as early as the machining step shown in FIG. 1a. An example of monitoring of this type is shown schematically in FIG. 2; in this way, for example, the rotational speed or another parameter of the workpiece that supports the toothing 2 is recorded over time. In the schematically shown situation, this monitoring moves within a background noise that takes place in the context of the rotational speed control, but, as shown in FIG. 2, undergoes a temporary peak-like spike (9) at the moment the chip 4 is pressed in, to which spike the monitoring responds. The underlying machine control system receives a corresponding "event" signal and then switches to an operating mode in which the additional machining process shown in FIG. 1c is carried out.

After this additional machining process, the desired tooth flank end geometry is present on the toothing 2 without material protrusions caused by the pressed-in chip 4', and the toothing ensures low-noise operation when later used in the gear system and does not pose any increased risks of gear system damage that would otherwise exist if the pressed-in chip 4' had remained undetected and the toothing 2 had been inserted into the gear system in this state.

The monitoring shown abstractly in FIG. 2 can be carried out in a variety of ways; see e.g. the measurement graph shown in FIG. 3 which depicts the time curve of the torque derived from the control loop for the tool spindle according to a preferred variant. However, also conceivable are other values derived from this control loop or the control loop for the workpiece spindle, or other measuring systems/sensors, such as measuring systems which detect the angular position of the tool spindle or workpiece spindle, speed sensors, displacement-measuring systems or structure-borne sound sensors.

In the additional machining process shown in FIG. 1c, the power skiving wheel 1 repeats the final finishing pass for producing the tooth flank end geometry with regard to the advancement depth. However, this is not absolutely necessary, and a pass using a slightly larger machining distance is also sufficient to catch and remove the pressed-in chip 4'.

Since the power skiving wheel 1 is axially advanced with respect to the toothing 2 in order to machine the entire toothing width, the monitoring situation shown in FIG. 2 can also be used to determine the time and thus the height seen in FIG. 1 of the location at which the chip 4 was pressed in, at least approximately. It is therefore not necessary for the additional toothing machining process to be carried out over the full width of the toothing, which can save time.

FIG. 4 shows another power skiving machine 100 comprising a control system 99, in which monitoring for the event is implemented using the aforementioned variants, for example. The machine is a CNC-controlled machine comprising individual drives for each of the movement axes X, Y, Z, A, C, C2 shown. The power skiving machine 100 therefore comprises, on the workpiece side, a workpiece spindle 70 arranged on a machine bed 80, which spindle is in this case designed as a vertical spindle. On the tool side, a radial carriage 61 which can be moved in the radial advancement direction X relative to the machine bed 80 is provided, on which carriage an axial carriage 62 mounted so as to be movable in the axial direction Z relative to said radial carriage pivotably supports a tangential carriage 63 in which the tool head having the tool spindle axis C2 is arranged. The pivot axis A is parallel to the radial axis X and allows the tool spindle axis C2 to pivot in the Y-Z plane, in order to set the axis intersection angle Σ between the rotational axis of the tool and the rotational axis of the workpiece for the typical machine axis configuration for power skiving.

Although the invention is preferably used for power skiving internal toothings, it is not limited to internal toothings or to the power skiving method. In particular, it is also conceivable to control hobbing machines, shaping machines, scraping machines comprising scraping tools or toothing machines for producing bevel gears by means of their respective control systems according to any of the aforementioned aspects. The toothing machines therefore have at least two operating modes, an additional machining process taking place in one operating mode compared with the other operating mode if the monitoring of the machine control system responds to the potential event of a chip being pressed into the toothing.

The invention is not limited to the details mentioned in the description of the drawings either. Rather, the features of the above description and the following claims may be essential, individually or in combination, for implementing the invention in its various embodiments.

The invention claimed is:

1. A method for machining a toothing of a workpiece, held in a clamping, with a toothing tool comprising cutting edges, said method comprising:

rotating said workpiece about a workpiece axis of rotation, rotating said toothing tool about a tool axis of rotation, bringing said rotating workpiece and said rotating toothing tool into a rolling chip-removing machining engagement to produce a predetermined tooth flank end geometry on said toothing of the workpiece in one or more machining passes including a machining pass which produces the predetermined tooth flank end geometry, monitoring said machining, during said machining pass which produces the predetermined tooth flank end geometry, to determine an event of a removed chip being pressed into a machined tooth flank of the toothing of the workpiece by means of the rolling chip-removing machining engagement thereby creating a material protrusion on top of the predetermined tooth flank end geometry, wherein, if the monitoring detects a chip being pressed into the machined tooth flank, carrying out a response to the monitoring comprising performing an additional toothing machining process that removes the material protrusion on top of the predetermined tooth flank end geometry formed by the pressed-in chip, said additional toothing machining process being implemented automatically and said additional toothing machining process being carried out in the same clamping of the workpiece and by said toothing tool.

2. Method according to claim 1, wherein the monitoring responds when an amplitude (A) of a time curve (8) of a parameter monitored by said monitoring exceeds a predetermined threshold value.

3. Method according to claim 2 wherein the monitored parameter shows the workpiece rotation and directly or indirectly shows the rotational speed of the workpiece or the torque of the workpiece rotation.

4. Method according claim 2 wherein the monitored parameter shows the tool rotation, and directly or indirectly shows the rotational speed of the tool or the torque of the toothing tool rotation.

5. Method according to claim 2 wherein the additional toothing machining process is a repetition, at least over a width portion of the toothing of the workpiece, of the machining pass that triggers the monitoring.

6. Method according to claim 2 wherein the additional toothing machining process is carried out using a larger distance between the toothing tool and the toothing of the workpiece compared with the machining pass which triggers the response of the monitoring.

7. Method according to claim 1 wherein the additional toothing machining process is a repetition, at least over a width portion of the toothing of the workpiece, of the machining pass that triggers the monitoring.

8. Method according to claim 7 wherein a toothing width range to which the event is to be assigned is determined from an exceedance of a threshold value, and the additional toothing machining process is carried out on a basis of the determined toothing width range.

9. Method according to claim 1 wherein the additional toothing machining process is carried out using a larger distance between the toothing tool and the toothing of the workpiece compared with the machining pass which triggers the response of the monitoring.

10. Method according to claim 9 wherein a toothing width range to which the event is to be assigned is determined from an exceedance of a threshold value, and the additional toothing machining process is carried out on a basis of the determined toothing width range.

11. Method according to claim 1 wherein two parameters of said machining are monitored and the monitoring responds if amplitudes of time curves of the two parameters exceed respective predetermined threshold values.

12. Toothing machine (100) comprising a workpiece spindle for rotationally driving the workpiece held in the clamping connected to the workpiece spindle, a tool spindle for rotationally driving the toothing tool, and a controller (99), characterized in that the controller can control the toothing machine so as to carry out the method according to claim 1.

* * * * *